United States Patent Office 2,787,553
Patented Apr. 2, 1957

2,787,553

METHOD FOR CONTROL OF TEXTURE OF DEHYDRATED POTATOES

James Cording, Jr., Philadelphia, and Miles J. Willard, Jr., Glenside, Pa., assignors to the United States of America as represented by the Secretary of Agriculture No Drawing. Application May 9, 1955,
Serial No. 507,187

1 Claim. (Cl. 99—207)

(Granted under Title 35, U. S. Code (1952), sec. 266)

A non-exclusive, irrevocable, royalty-free license in the invention herein described, for all governmental purposes, throughout the world, with power to grant sublicenses for such purposes, is hereby granted to the Government of the United States of America.

This invention relates to processes for the production of dehydrated cooked potatoes and has among its objects the production of dehydrated potatoes that upon reconstitution yield potatoes having substantially the appearance, flavor and, in particular, the mealy texture of fresh cooked potatoes.

In previously known methods for dehydrating potatoes more or less cell damage occurs so that the products, upon reconstitution, were always of poorer texture than the fresh potato. Heretofore, the only known way to produce dehydrated potatoes that would have the desired mealy texture after reconstitution has comprised using high solids potatoes as raw material and if the potatoes had been stored at low temperature for any appreciable time, reconditioning them by storing for about two weeks at ordinary temperatures before use. Because of these limitations, a great part of the annual potato crop could not be used in the preparation of dehydrated potato, thus adding to the cost of the dehydrated product and reducing the value of the unsuitable potatoes.

We have now discovered a simple and inexpensive process whereby any sound potatoes, regardless of variety, geographical origin, storage history or density, can be converted into dehydrated cooked potatoes of high quality which upon reconstitution by the addition of fluid such as water or milk yield potatoes having appearance, flavor and texture at least as good if not better than the same product prepared from the fresh potatoes.

According to the invention, potatoes to be dehydrated are subjected to a precooking treatment at about 140–180° F. for about 10 to 60 minutes, after which they are cooked at about 212° F. for about 16 minutes, mashed, and then dehydrated by a process as specified below.

The mealiness of the product (after reconstitution) can be accurately controlled by suitable choice of the temperature and time of the precooking treatment. Naturally, the particular temperature and time required to achieve a given degree of mealiness will depend to a large extent on the type and history of the particular batch of potatoes being processed. In general, maximum mealiness is achieved by precooking at a temperature in the lower part of the range, say about 140–150° F., and for a fairly long time, say about one hour. Such a treatment, however, may produce an undesirably high degree of mealiness when used on high quality, high solids potatoes, in which case a higher temperature or a shorter time, or both, may be preferable.

Any convenient means of heating the potatoes may be used in the precooking treatment. A water bath is usually the most practical although steam or hot air may be used. Whole unpeeled potatoes may be used, but as a means of facilitating the transfer of heat into the interior of the potato we generally prefer to cut the potatoes into slices, cubes or other convenient pieces. In the production of dehydrated diced potatoes it may be convenient to dice the raw potato before the precooking process. For the preparation of flakes or granules the raw potatoes may be cut into any shape or even left whole, for the precooking and cooking steps. They are then mashed before being dried.

A product of highest quality is obtained when potato flakes are made by dehydrating the mashed potatoes in the manner described in our copending application entitled, "Dehydration of Cooked Potato," filed April 1, 1954, Serial No. 420,475. The process there described comprises drying cooked mashed potato in the form of a thin film (about 0.005 to 0.015 inch thick) on a heated surface to a final moisture content of about 4 to 10%. The preferred process utilizes a double drum drier having the rolls heated internally by steam and being adjusted to a clearance of about 0.005 to 0.015 inch. The flakes thus produced are of substantially monocellular thickness and contain a minimum of ruptured cells and free starch.

In processing high solids potatoes to make flakes by our drum drying method it is preferred that the cooked, mashed potatoes be diluted with water to a solids content of about 20% before dehydration, as is more fully disclosed in our copending application entitled "Drum Drying of Cooked Mashed Potatoes," filed November 15, 1954, Serial No. 469,065. Such dilution before drum drying causes the mashed potato to spread on and adhere more uniformly to the rolls of the drier and yields a denser and less fragile flake. Potatoes precooked according to the present invention show the same benefits from dilution of the cooked mashed potatoes before dehydration.

When dehydrated potato flakes or granules made by conventional processes are reconstituted to make mashed potatoes, 1 part by weight of dehydrated potatoes requires 4½ parts of water or water and milk to produce the normal consistency of mashed potatoes. When dehydrated flakes or granules made by the process of the present invention are reconstituted about 10% more fluid is required; that is, about 5 parts of fluid per part of dehydrated potatoes. This is a distinct advantage for our product because it means that a smaller amount of dehydrated potatoes is required to prepare a given amount of mashed potatoes.

The practice of our invention is further illustrated by the following examples. In these experiments, Idaho Russet Burbank potatoes of specific gravity 1.075 to 1.085 were used; these being of lower solids content than are normally used in conventional processes for making dehydrated cooked potatoes. In all these experiments the potatoes were abrasion peeled, hand trimmed, sliced into ⅝-inch thick slices and rinsed to remove free starch. Different portions of the lot were then given various precooking treatments as shown below, after which they were cooked in live steam at atmospheric pressure (212° F.) for 16 minutes. They were then mashed, diluted with water to about 20% solids content and dehydrated on a double drum dried as described in our above mentioned copending applications. The dried flakes thus obtained were reconstituted by addition of 1¼ parts by weight of cold milk and 3¾ parts of boiling water to each part of potatoes. The resulting products were submitted to a panel of taste experts for evaluation as mashed potatoes with especial attention to texture (mealiness).

The first series of experiments was run to determine the optimum temperature for the precooking step. In this series the sliced potatoes were immersed for 30 minutes in water maintained at the specified temperature. They were then cooked, dehydrated, reconstituted and evaluated as described above.

*Table I.—Effect of temperature of precook*

| Example | Temp. of Precook, °F. | Texture and Quality of Product |
|---|---|---|
| 1 | 140 | Excessively mealy; grainy; slight off-flavor[1]; fair quality. |
| 2 | 155 | Optimum mealiness; excellent quality. |
| 3 | 165 | Less mealy than 2; more than 4; excellent quality. |
| 4 | 180 | Less mealy than 3; more than 5; good quality. |
| 5 | No precook | Pasty; no mealiness; poor quality. |

[1] Probably due to enzymatic action at this temperature.

A series of experiments similar to that of Table I was run in which the temperature of the precook bath was held constant at 155° and the time of precook was varied. Results are shown in Table II.

*Table II.—Effect of time of precook*

| Example | Time, Min. | Texture and Quality of Product |
|---|---|---|
| 6 | 10 | Slightly pasty; fair quality, better than 5. |
| 7 | 20 | Good mealiness, no pastiness; good quality. |
| 8 | 30 | Optimum mealiness; highest quality. |
| 9 | 60 | Very mealy; good quality.[1] |

[1] Some loss of flavor due to removal of soluble components.

In another series of experiments, the potatoes were precooked in steam rather than in water. The products thus obtained were in general similar to those precooked in the water bath, though most tasters rated them slightly less mealy than samples precooked in a water bath at the same temperature and for the same time. Loss of flavor was less with the steam precook, presumably because of the reduced leaching effect of the precook treatment.

Experiments with high solids Idaho Russets or with high or low solids Maine Russets, Katahdins or Kennebecs showed the same qualitative effects of time and temperature of precooking, although in general, the quality of the products from high solids potatoes was rated slightly higher than that from low solids potatoes. This difference, however, was not due to improvement in graininess since optimum graininess could be obtained from any type potatoes by proper choice of time and temperature of precook.

In the above examples all the experiments involved drying the mashed potatoes on double drum driers. This was done so as to enable direct comparison of the products precooked at different temperatures or for different times and should not be construed as indicating that other processes and equipment for the dehydration step cannot be used. On the contrary, all the conventional dehydration processes yield improved products when the potatoes to be dehydrated are precooked according to the present invention. Our process is particularly suited to the production of dehydrated potato dice, flakes and granules. In the production of dice, the cooking step is omitted and the precooked dice are sent directly to the drier.

We claim:

A process for producing dehydrated potatoes comprising precooking raw potatoes at a temperature of about 140 to 180° F. for about 10 to 60 minutes, cooking the precooked potatoes at about 212° F. for about 16 minutes, mashing the cooked potatoes, drying the mashed potatoes to a final moisture content of about 4 to 10% by applying a film substantially of monocellular thickness of the mashed potatoes to a heated surface, and recovering the dried potatoes from said surface.

References Cited in the file of this patent

UNITED STATES PATENTS

| 2,190,063 | Gano | Feb. 13, 1940 |
| 2,339,757 | Baer | Jan. 25, 1944 |
| 2,439,119 | Willets et al. | Apr. 6, 1948 |
| 2,564,296 | Bostock | Aug. 14, 1951 |

FOREIGN PATENTS

| 436,353 | Great Britain | Oct. 9, 1945 |